United States Patent [19]
Pitzer et al.

[11] Patent Number: 6,053,972
[45] Date of Patent: Apr. 25, 2000

[54] NON-SILKING IRON OXIDE YELLOW PIGMENTS WITH HIGH COLOR DENSITY

[75] Inventors: Ulrike Pitzer; Rolf Naumann; Rolf-Michael Braun, all of Krefeld, Germany

[73] Assignee: Bayer AG, Leverkusen, Germany

[21] Appl. No.: 09/192,632

[22] Filed: Nov. 16, 1998

[30] Foreign Application Priority Data

Nov. 19, 1997 [DE] Germany ............... 197 51 141

[51] Int. Cl.$^7$ .................................. C01G 49/02
[52] U.S. Cl. .................. 106/456; 106/459; 423/632
[58] Field of Search ................ 106/456, 459; 423/432

[56] References Cited

U.S. PATENT DOCUMENTS

| | | | |
|---|---|---|---|
| 4,620,879 | 11/1986 | Burow et al. ............ | 106/456 |
| 4,911,760 | 3/1990 | Burow et al. ............ | 106/456 |
| 5,185,141 | 2/1993 | Krokert et al. .......... | 423/633 |

FOREIGN PATENT DOCUMENTS

| | | |
|---|---|---|
| 387 572 | 9/1990 | European Pat. Off. . |
| 704 498 | 4/1996 | European Pat. Off. . |
| 704 500 | 4/1996 | European Pat. Off. . |

OTHER PUBLICATIONS

Patent Abstracts of Japan, vol. 016, No. 228, May 27, 1992.

*Primary Examiner*—C. Melissa Koslow
*Attorney, Agent, or Firm*—Connolly Bove Lodge & Hutz LLP

[57] ABSTRACT

Non-silking iron oxide yellow pigments with high color density.

Iron oxide yellow pigments in the $\alpha$-FeOOH modification with a silking index of less than 5 were obtained in which a) $\alpha$-FeOOH seeds are produced by precipitation from an Fe(II)-containing solution with an alkaline precipitating agent in the presence of soluble aluminium salts in an amount of 3 to 9 wt. %. calculated as $Al_2O_3$, with respect to precipitated $\alpha$-FeOOH, and subsequent oxidation to $\alpha$-FeOOH and b) pigment growth is performed by precipitating further iron with simultaneous oxidation, wherein the seed/time yield is less than 0.3 $h^{-1}$ and the pH value is less than 3.9 over the entire period of pigment growth and c) pigment growth is terminated at a reproduction factor between 3 and 20.

20 Claims, No Drawings

NON-SILKING IRON OXIDE YELLOW PIGMENTS WITH HIGH COLOR DENSITY

The present patent application relates to iron oxide yellow pigments in the α-FeOOH modification with a low silking index which have a high yellow index b*, a process for their preparation and their use.

Yellow iron oxide pigments in the α-FeOOH modification can be prepared by precipitation processes from Fe(II)-salt solutions followed by oxidation with air or other oxidising agents or by the so called Penniman-Zoph process in the presence of metallic iron and simultaneous oxidation with air or by oxidation of metallic iron with other oxidising agents, in particular with aromatic nitro compounds.

The yellow iron oxides prepared in this way are mainly used as pigments in lacquers and paints, building materials or for colouring plastic materials.

The colouring properties of yellow iron oxide pigments are substantially determined by the particle size, particle shape, particle size distribution and by the state of agglomeration. α-FeOOH particles which have been prepared by the processes mentioned above generally crystallise in a very definite needle shape. The scattering and absorption coefficients perpendicular and parallel to the needle axis differ considerably. If the needles are first arranged perpendicular and then parallel to the direction of observation, considerable colour differences are visible to the observer. This effect is called the silking effect because it can also be observed on silk fabrics. With reference to iron oxide pigments the silking effect is a particular nuisance in the case of lacquers which are applied in one direction (so-called image framework effect) and as a result of the alignment of pigments during the extrusion and calendering of plastics and plastic foils.

Patent DE-C 33 26 632 describes processes for preparing iron oxide yellow pigments with a low silking effect. The pigments described there are prepared in such a way that the production of seeds takes place in the presence of compounds of the elements B, Al, Ga, Si, Ge, Sn or Pb, in particular in the presence of silicates or aluminates, in amounts of 0.05 to 10 wt. %, calculated as the 3- or 4-valent oxides and with respect to the α-FeOOH precipitated during seed production, and an iron oxide yellow pigment can be grown onto the yellow seed prepared in this way in a conventional manner. Relating to the process of pigment growth in DE-C 33 26 632 reference is made to the prior art. The patent examples show that precipitation is performed at a constant pH of 4.0±0.1 and that the growth takes place relatively rapidly so that reproduction factors of 7 to 14 are achieved after 12 to 25 hours. The pigments are characterised in that they have a very low silking effect and in a colour test in a lacquer based on ®Alkydal F48 (medium-oil alkyd resin lacquer; Bayer AG) at a pigment/volume concentration of 10%, the limits for L* are between 52 and 63, for a* are between 8 and 14 and for b* are between 40 and 48, on the CIELAB colour coordinates. Elimination of the silking effect is achieved in that highly dendritic needles are produced which grow together to give spherical aggregates (like little "hedgehogs"). These approximately isometric aggregates can no longer be aligned in specific preferred directions.

The disadvantage of the pigments prepared in accordance with DE-C 33 26 632 is that they are sensitive to milling and on the other hand do not quite achieve peak values for the yellow index b* which is obtained by some light yellow iron oxide pigments with a silking effect.

The object was therefore to prepare non-silking iron oxide yellow pigments which are relatively insensitive to milling and have a high yellow index b*.

Surprisingly, the desired pigment can be prepared by starting from the same seeds described in DE-C 33 26 632 which are built up in the process of pigment growth to completely dendrite-free primary particles. These primary particles are agglomerated to packages, where several particles lie side by side. The primary particles themselves have only a very low tendency to be needle shaped. Technically, the modified primary particles and agglomerated structure are achieved by building up the pigment at pH values less than 3.9, preferably less than 3.8 and at the same time by building up the pigments very slowly.

The invention provides a process for preparing iron oxide yellow pigments in the α-FeOOH modification in which a) α-FeOOH seeds are produced by precipitation from an Fe(II)-containing solution using an alkaline precipitating agent in the presence of soluble aluminium salts in an amount of 3 to 9 wt. %, calculated as $Al_2O_3$, with respect to precipitated α-FeOOH, and subsequent oxidation to give α-FeOOH and b) the pigment is produced by precipitating further iron with simultaneous oxidation, wherein the seed/time yield is less 0.3 $h^{-1}$, preferably less than 0.2 $h^{-1}$, and the pH over the entire period of pigment growth is less than 3.9, preferably less than 3.8 and c) pigment growth is terminated at a reproduction factor between 3 and 20.

Thus, in the first process step, α-FeOOH seeds are prepared by initially introducing an Fe(II) salt solution, preferably an $FeSO_4$ solution, and an aluminium salt solution, preferably an aluminium sulphate solution, this mixture is heated to the desired seed production temperature which can vary between room temperature and 80° C. then part of the iron ions are precipitated using an alkaline precipitating agent, with stirring, wherein alkali metal and alkaline earth metal oxides, hydroxides or carbonates and ammonia may be mentioned as precipitating agents, and then the precipitated product is oxidised to α-FeOOH using air or other oxidising agents. The $Al_2O_3$ concentration is between 3 and 9 wt. %, with respect to the α-FeOOH produced.

In the second process step, these seeds grow via a precipitation and oxidation process to give pigments by adding further iron(II) salt solution and converting the iron(II) to α-FeOOH by controlled addition of precipitating agent and simultaneous oxidation. In order to be able to obtain pigments according to the invention, it must be ensured that the pH value during the entire pigment production step is less than 3.9, preferably less than 3.8 and at the same time that pigment grouch is performed very slowly. The concentration-independent quantity, the so-called seed/time yield has proven useful for characterising the rate of pigment growth. This is defined as:

$$\text{Seed/time yield} = \frac{\text{Amount of pigment produced}}{\text{Amount of seed used} \times \text{pigment used growth period}}$$

$$= \frac{RF - 1}{\text{Pigment growth period}}$$

The so-called reproduction factor (RF) is the ratio of total amount of pigment (=amount of seed+amount of pigment produced) to amount of seed.

In order to prepare pigments according to the invention, a seed/time yield of less than 0.3 $h^{-1}$, preferably less than 0.1 $h^{-1}$, is required. The seed/time yield can be controlled by the pH value and the rate of aeration.

The seeds are built up to reproduction factors between 3 and 20, depending on whether the pigment is intended to be used as a pure shade or for lightening. Highly built-up pigments with a reproduction factor between 8 and 20 are characterised by a particularly high CIELAB index b* when used as a pure shade. These types of iron oxide yellow pigments have colour indices in the CIELAB colour coordinates, in a pure shade with a pigment/volume concentration of 10% in a test lacquer, of a* between 8 and 14, b* between 48.5 and 52 and L* between 54 and 62.

Less highly built-up pigments with a reproduction factor between 3 and 8 are characterised by a particularly high CIELAB index b* for lightening. These types of iron oxide yellow pigments have colour indices on the CIELAB colour coordinates for lightening with a titanium oxide pigment in the ratio 1:5, at a pigment/volume concentration of 10% in the test lacquer, of a* between 3 and 7 and b* between 38 and 41.

Electron microscope photographs show that the primary particles, in contrast to the processes known hitherto, have only a weakly expressed needle shape, are completely free of dendrites and are agglomerated to packages where the primary particles lie side by side. The yellow index b* of the pigments is modified only very slightly during milling.

Pigments according to the invention are all characterised by a low silking index of less than 5, preferably less than 3, in particular less than 1.

Furthermore, the pigments according to the invention are characterised by a low binder requirement during the preparation of lacquers. This can be characterised by oil absorption indices of less than 40 g/100 g.

Due to their properties, the pigments according to the invention are particularly suitable for preparing lacquers and paints and for colouring plastic materials. Use of the pigments according to the invention for colouring lacquers, paints or plastic materials is therefore also an object of the invention.

The parts and percentages quoted in the following examples refer to weight unless stated otherwise.

1. Silking Index

The so-called silking index is defined as a standard, independent quantity for measuring the silking effect. The silking index is measured and calculated using the following methods:

1.1 Preparation in an Alkyd Resin Paste to Measure the Silking Index

The pigment is prepared using an automatic muller in a non-drying test binder. The test binder (paste) consists of two components:

Component 1

Component 1 is an alkyd resin binder based on linseed oil and phthalic anhydride. It corresponds to the specifications which are mentioned in the standards DIN EN ISO 787-24:1995, ISO 787-25:1993 and DIN 55 983 (1983) as specifications for a test binder for coloured pigments. The product ®Sacolyd L 640 (Krems Chemie, formerly ®Alkydal L 64, Bayer AG) is used.

Component 2

Component 2 is a rheological additive which is added to make the paste thixotropic. A powdered, modified, hydrogenated castor oil, ®LUVOTHIX HT (Lehmann & Voss & Co) is used at a concentration of 5.0%.

The Luvothix HT is dissolved in the Sacolyd L 640 at 75 to 95° C. The cooled. spreadable material is passed once through a triple-roll mill. The paste is then ready for use.

An automatic muller is used to prepare the pigment paste, as described in DIN EN ISO 8780-5 (1995). An ®ENGELSMANN JEL 25/53 muller with an effective plate diameter of 24 cm is used. The speed of rotation of the lower plate is about 75 $min^{-1}$. By suspending a 2.5 kg loading weight on the loading attachment, the force between the plates is adjusted to about 0.5 kN. 0.40 g of pigment and 5.00 g of paste are dispersed in three stages of 25 revolutions each in accordance with the method described in DIN EN ISO 8780-5 (1995) section 8.1.

Then the pigment/paste mixture is painted onto a paste film holder which corresponds in function to the paste film holder in DIN 55983 (December 1983). The doctor blade associated with the paste holder is drawn over the depression in the holder filled with the pigment paste mixture so that a smooth surface is produced. The doctor blade is moved in one direction at a speed of about 3 to 7 cm/s. Any needle-shaped particles present in the paste are then aligned in the direction of spreading. The sample is measured within a few minutes.

1.2 Instrument for Measuring the Silking Index

The measuring geometry 8/d used for silking measurement is described in ISO 7724/2-1984 (E) point 4.1.1, in DIN 5033 part 7 (1983) point 3.2.4 and in DIN 53 236 (January 1983) point 7.1.1. A ®PERKIN ELMER LAMBDA 19 spectrophotometer with a ®LABSPHERE integrating sphere of 15 cm diameter is used.

A commercially available polarizing filter of adequate size is placed outside the integrating sphere, in the illuminating beam for the sample port, in a defined position for measurement, so that the direction of the electric field Vector E of the transmitted light beam is known at the sample port. The filter has a degree of polarizing >99%. The reference beam remains unchanged without a filter.

The reference port in the integrating sphere is covered with a diffuse scattering white opal glass standard. A gloss trap is not used.

A further white opal glass standard (working standard) is mounted at the sample port and the instrument is calibrated. The working standard complies with the specifications described in ISO 7724/2-1984 (E) section 8.3. The reflectance data for the working standard against a perfect reflecting diffuser are stored in the computer so that all color measurements are given with respect to the perfect reflecting diffuser after calibration with the white working standard. The dark current at the zero point is measured with a black-cavity light trap, stored in the computer and taken into account by the measurement programme during calibration.

1.3 Measurement and Calculation of the Silking Index

Measurement takes place immediately after preparation of the test specimen. The temperature of the spectrophotometer and sample is about 25° C.±5° C.

The sample is measured in two positions at right angles to each other with reference to the polarizing filter:

Measurement Y1: The pigment particles are directed with their longest axes largely parallel to the electric field vector of the illuminating beam. The spreading direction on the paste film holder is parallel to the electric field vector.

Measurement Y2: The pigment particles are aligned with their longest axes largely perpendicular to the electric field vector of the illuminating beam. The spreading direction on the paste film holder and the electric field vector are perpendicular to each other.

A device for rotating the sample through 90° is useful but not absolutely necessary if appropriate markings are applied at the sample port.

The tristimulus value Y is calculated from the measured reflectance spectra in accordance with the calculation instructions in ASTM E 308—1985. point 7. The 1931 weighting functions for Standard Illuminant C and the 2°

Standard Observer are used in Table 5.6. The wavelength range is between 400 nm and 700 nm. The wavelength interval is 20 nm. The specular Component is included in the calculations.

The silking index SI is then calculated as follows from the tristimulus value Y:

$$SI = (1 - Y1/Y2-) \times 100$$

The results are rounded to the nearest whole number.

2. CIELAB Color Coordinates 2.1 Preparation in an Alkyd Resin Lacquer for Measuring the Mass Tone (Full Shade)

The pigment is dispersed in an air-drying lacquer system using a muller. The lacquer system consists of the following components:

- 95.26% ®ALKYDAL F 48 (binder, Bayer AG, medium-oil, air-drying alkyd resin based on drying plant fatty acids in white spirit/xylene mixture 38:7 with a non-volatile fraction of about 55%, oil content/triglyceride in the non-volatile fraction about 48%, phthalic anhydride in the non-volatile fraction about 26%)
- 0.78% 2-butanone oxime, 55% strength in white spirit (skin-preventing agent)
- 1.30% ®Octa Soligen calcium (wetting agent, calcium salt of branched $C_6$–$C_{19}$ fatty acids in a hydrocarbon mixture (contains 4% Ca), Borchers AG)
- 0.22% ®Octa Soligen cobalt 6 (drying agent, cobalt (2+) salt of branched $C_6$–$C_{19}$ fatty acids in a hydrocarbon mixture (contains 6% cobalt), Borchers AG)
- 0.87% ®Octa Soligen zirconium 6 (drying agent, zirconium salt of branched $C_6$–$C_{19}$ fatty acids in a hydrocarbon mixture (contains 6% Zr). Borchers AG)
- 1.57% n-butyl glycolate (=butyl ester of hydroxyacetic acid) (levelling agent)

The components are mixed with a high speed stirrer to give the final lacquer. A muller as described in DIN EN ISO 8780-5 (April 1995) is used. An ®ENGELSMANN JEL 25/53 muller with an effective plate diameter of 24 cm is used. The speed of rotation of the lower plate is about 75 min$^{-1}$. By suspending a 2.5 kg loading weight on the loading attachment, the force between the plates is adjusted to about 0.5 kN. 0.80 g of pigment and 2.00 g of lacquer are dispersed in one step at 100 revolutions with 2.5 kg loading weight according to the process described in DIN EN ISO 8780-5 (April 1995) section 8.1. The Muller is opened and the lacquer is rapidly collected in the lower plate away from the mid-point. Then a further 2.00 g of lacquer are added and the plates clamped together. After two stages at 50 rotations without a loading weight, preparation is terminated.

The pigmented lacquer is painted with a film applicator (clearance at least 150 μm, at most 250 μm) onto a non-absorbable white paper. The lacquered chart is then dried for at least 12 hours at room temperature. Prior to the colour measurement the chart is dried at about 65° C. (±5° C.) for 1 hour and then cooled.

2.2 Preparation in an Alkyd Resin Lacquer for Measuring the Reduction

The pigment and the lightening pigment are dispersed using a muller in an air-drying lacquer system. As lightener, a commercially available ®Bayertitan R-KB-2 titanium dioxide pigment (Bayer AG) is used. This pigment corresponds to type R 2 in ISO 591—1977. The lacquer system corresponds to that described under item 2.1.

The components of the lacquer system are mixed in a high speed stirrer to give the final lacquer.

The pigmented lacquer is prepared and the lacquered chart is produced in the same way as described under 2.1, wherein 0.1500 g of the pigment being tested, 0.7500 g of ®Bayertitan R-KB-2 titanium dioxide pigment and 2×2.00 g of lacquer are weighed out.

2.3 Spectrophotometer

A spectrophotometer with an integrating sphere and with the measuring geometry d/8 without a gloss trap is used. This measuring geometry is described in ISO 7724/2—1984 (E) point 4.1.1, in DIN 5033 part 7 (July 1983) point 3.2.4 and in DIN 53236 (January 1983) point 7.1.1. A ®Dataflash 2000 instrument from the Datacolor International Co. is used.

The spectrophotometer is calibrated with a white, ceramic working standard, as described in ISO 7724/2-1984(E) point 8.3. The reflectance data for the working standard are compared against a perfect reflecting diffuser in the colouring measuring instrument so that after calibration with the white working standard all color measurements are given with reference to the perfect reflecting diffuser. Zero point calibration is carried out using a black-cavity light trap from the spectrophotometers manufacturer.

2.4 Color Measurement

No gloss trap is used. The temperature of the spectrophotometer and the specimen is about 25° C.±5° C.

The lacquer chart prepared in accordance with 2.1 or 2.2 is mounted onto the sample port of the spectrophotometer so that the sample port covers a central location on the painted layer. The sample must lie flat without any gap between chart and sample port. The measuring opening must be covered completely by the lacquer layer. Measurement then takes place.

2.5 Calculating the CIE Coordinates

The 1976 CIE coordinates L*, a* and b* are calculated from the measured reflectance spectrum in accordance with the calculation instructions in ASTM E 308—1985, point 7. The weighting functions for standard illuminant C and the 1931 2° standard observer in ASTM E 308—1985, table 5.6 are used. The wavelength range is between 400 nm and 700 nm. The wavelength interval is 20 nm. The specular component is included in the calculations.

EXAMPLES

The invention is described in the following by way of examples, without this being regarded as a restriction.

Example 1

8 l of a technical grade iron sulphate solution with a concentration of 170 g/l is placed in a glass container. 321 g of an $Al_2(SO_4)_3$ solution containing 7.54 wt. % calculated as $Al_2O_3$ is added thereto. The solution is heated to 40° C. while nitrogen gas is passed through it. The pH is adjusted to 3.5 by adding NaOH. Then with further aeration with nitrogen and stirring, 1056 ml of caustic soda solution with a concentration of 344 g of NaOH/l are added over the course of 20 min. When precipitation has finished, the mixture is aerated with air at 150 l/h, with stirring at 40° C. When the pH has dropped to 3.6, seed formation is terminated.

In order to produce the pigment, 4196 ml of the seed suspension of nuclei mentioned above, 1235 ml of iron sulphate solution with an $FeSO_4$ concentration of 231.4 g/l and 569 ml of water are heated to 75° C., with stirring, in a glass container. Then pigment growth is started by simultaneously controlling the addition of caustic soda solution and aeration with air so that the pH is held between 3.5 and 3.7. Each time the iron sulphate concentration drops below a value of 5 g/l, a further batch of iron sulphate solution is added so that the concentration after topping up increases again to 30 g/l. After an oxidising time of 204 h, a sample is taken out, filtered, washed, dried, deagglomerated milling in a micro-dismembrator (Braun AG) for 8 sec and analysed. The reproduction factor is 17.1. The seed/time yield calculated is 0.08 h$^{-1}$. The data on colour evaluation are given in table 1. In addition to the absolute colour indices the difference colour indices as compared with the type ®Bayferrox 920 (Bayer AG) are also given. The aluminium content of the pigment is 0.14%.

Example 2

Same as example 1, but using pure iron sulphate solution. After an oxidising time of 164 h, a sample is taken out, filtered, washed, dried and deagglomerated. The reproduction factor is 15.8. The seed/time yield calculated is 0.09 h$^{-1}$. The data for colour evaluation are given in table 1.

Example 3

Same as example 2, but the sample is taken after an oxidising time of 184 h. The reproduction factor is 17.7. The seed/time yield calculated is 0.09 h$^{-1}$. On a transmission electron microscope photograph, only short needled particles can be detected which are agglomerated to packages of several primary particles. The sample was milled with 10 mm agate spheres for 60 sec. respectively 120 sec. in a micro-dismembrator (Braun Co.) during incorporation into a lacquer to test for sensitivity to milling. The data for colour evaluation are given in table 1. The difference colour indices as compared with Bayferrox 920 are also cited alongside the absolute colour indices. The aluminium content of the pigment is 0.15%.

Example 4

8 l of a technical grade iron sulphate solution with a concentration of 170 g/l are placed in a glass container. 321 g of an Al$_2$(SO$_4$)$_3$ solution, containing 7.54 wt. % calculated as Al$_2$O$_3$, are added. The solution is heated to 40° C. while nitrogen is passed through it. The pH is adjusted to 3.5 by adding NaOH. Then 1124 ml of caustic soda solution with a concentration of 323 g NaOH/l are added over the course of 20 min with further aeration with nitrogen and stirring. After completion of precipitation, the mixture is aerated with 150 l/h of air at 40° C. with further stirring. When the pH has dropped to 3.5, seed production is terminated.

To build up the pigment, 4358 ml of the seed suspension of nuclei mentioned above, 1301 ml of iron sulphate solution, with an FeSO$_4$ content of 210 g/l, and 341 ml of water are heated to 75° C., with stirring, in a glass container. Pigment production is started by simultaneous control of the addition of caustic soda solution and aeration with air, so that the pH is held between 3.2 and 3.8. Each time the iron sulphate content drops to a value below 10 g/l, a batch of 2857 ml of iron sulphate solution is added. After an oxidising time of 45 h a sample is removed, filtered, washed, dried, deagglomerated by 8 sec milling in a micro-dismembrator (Braun Co.) and analysed. The reproduction factor is 6.2. The nucleus/time yield calculated is 0.12 h$^{-1}$. The sample was tested for lightening. The colour evaluation data are given in table 1.

Comparison Example 1 (In Accordance with DE-C 33 26 632, Example 4)

250 ml of aluminium sulphate solution which contains 117 g of Al$_2$(SO$_4$)$_3$.18H$_2$O are added to 15309 ml of an iron sulphate solution with an FeSO$_4$ content of 200 g/l. The solution is heated to 55° C. Then 2506 ml of NaOH solution with an NaOH content of 323 g/l are added over the course of 20 min, with stirring and aeration with nitrogen and then the mixture is aerated with 400 l/h of air. Seed production is terminated when the pH value reaches 2.8.

2777 ml of the seed suspension mentioned above and 7129 ml of water are heated to 80° C. with the passage of nitrogen. With simultaneous aeration using 1000 l/h of air and pH-controlled addition of caustic soda solution with a concentration of 190 g/l of NaOH, 10.75 l of FeSO$_4$ solution with a concentration of 200 g/l of FeSO$_4$ are added dropwise over the course of 12 h so that the pH remains constant at 4.0±0.1. The pigment produced is filtered, washed, dried and deagglomerated. The reproduction factor is 11.1. The seed/time yield calculated is 0.84 h$^{-1}$. The colour evaluation data are given in table 1. The difference colour values compared with Bayferrox 920 are also cited alongside the absolute colour values.

Comparison Example 2 (In Accordance with DE-C 33 26 632, Example 7)

400 ml of aluminium sulphate solution which contains 351 g of Al$_2$(SO$_4$)$_3$.18H$_2$O are added to 15309 ml of an iron sulphate solution with an FeSO$_4$ concentration of 200 g/l. The solution is heated to 55° C. Then, with stirring and aeration with nitrogen, 2506 ml of NaOH solution with an NaOH concentration of 323 g/l are added over the course of 20 min and then the mixture is aerated with 400 l/h of air. Seed production is completed when the pH reaches 2.8.

2978 ml of the seed suspension mentioned above and 7022 ml of water are heated to 80° C. aeration with nitrogen. With simultaneous aeration using 1000 l/h of air and pH-controlled addition of caustic soda solution with a concentration of 190 g/l of NaOH, 7 l of FeSO$_4$ solution with a concentration of 200 g/l of FeSO$_4$ are added dropwise over the course of 13 h so that the pH remains constant at 4.0±0.1. The pigment produced is filtered, washed, dried and deagglomerated. The reproduction factor is 7.2. The nucleus/time yield calculated is 0.48 h$^{-1}$. The sample is milled in a micro-dismembrator (Braun Co.), using 10 mm agate spheres, for 60 sec. or 120 sec. in order to test the sensitivity to milling during incorporation into a lacquer. The colour evaluation data are given in table 1. The difference colour indices compared with Bayferrox 920 are given in addition to the absolute colour indices.

TABLE 1

Colour evaluations of samples from examples 1 to 6

| Example | Milling | Silking index | Pure shade or lightening | a* | b* | L* | da* against Bayferrox 920 | db* against Bayferrox 920 | dL* against Bayferrox 920 |
|---|---|---|---|---|---|---|---|---|---|
| 1 | 8 sec | 0.8 | Pure shade | 12 | 49.3 | 59 | 1.2 | 2.9 | −0.5 |
| 2 | 8 sec | 0.6 | Pure shade | 12 | 48.8 | 58.2 | 1.2 | 2.4 | −1.3 |
| 3 | 8 sec | 0.8 | Pure shade | 12.1 | 48.8 | 58.1 | 1.3 | 2.4 | −1.4 |
|   | 60 sec | 1.9 | Pure shade | 11.3 | 48.8 | 59.4 | 0.3 | 2.6 | 0.1 |
|   | 120 sec | 2.5 | Pure shade | 11 | 48.6 | 59.8 | 0 | 2.4 | 0.5 |
| 4 | 8 sec | 1.5 | Lightening | 4.1 | 39 | 82.1 | −0.3 | 4.7 | 4.7 |
| 5 | 8 sec | 3.5 | Pure shade | 11 | 43.7 | 58.3 | 0.1 | −2.6 | −1 |
| 6 | 8 sec | 1.4 | Pure shade | 12.7 | 45.1 | 56 | 1.9 | −1.3 | −3.5 |
|   | 60 sec | 1.6 | Pure shade | 12.3 | 44.6 | 56.2 | 1.5 | −1.8 | −3.3 |
|   | 120 sec | 1.8 | Pure shade | 12.2 | 44.1 | 56.2 | 1.4 | −2.3 | −3.3 |

Comment on example 3 respectively 6: The pigment wich was prepared in example 3 (6) was milled with the lacquer for different times (8s, 120s respectively 160s). These different lacquer preparations have different colors and coloristic values which are shown in the table. Example 3 demonstrates that pigment of example 3 is quite less sensitive to milling than comparative example 6 according to b*.

What is claimed is:

1. A process for preparing iron oxide yellow pigments in the α-FeOOH modification which comprises
   a) producing α-FeOOH seeds by precipitation from an Fe(II)-containing solution using an alkaline precipitating agent in the presence of soluble aluminum salts in an amount of 3 to 9 wt. % calculated as $Al_2O_3$, with respect to precipitated α-FeOOH, with subsequent oxidation to give α-FeOOH; and
   b) producing pigment by precipitating further iron with simultaneous oxidation, wherein the seed/time yield is less than 0.3 $h^{-1}$ and the pH over the entire period of pigment growth is less than 3.9; and
   c) terminating pigment growth at a reproduction factor between 3 and 20.

2. A process according to claim 1, wherein pigment production is terminated at a reproduction factor between 8 and 20.

3. A process according to claim 1, wherein pigment production is terminated at a reproduction factor between 3 and 8.

4. Iron oxide yellow pigments in the α-FeOOH modification with a silking index SI of less than 5, whose color indices on the CIELAB color coordinates in the pure shade and with a pigment/volume concentration of 10% in the test lacquer are a* between 8 and 14, b* between 48.5 and 52 and L* between 54 and 62.

5. Iron oxide yellow pigments according to claim 4, wherein the silking index SI is less than 3.

6. Iron oxide yellow pigments according to claim 4, wherein the silking index SI is less than 1.

7. Iron oxide yellow pigments in the α-FeOOH modification with a silking index of SI less than 5, whose color indices on the CIELAB color coordinates during lightening with a titanium dioxide pigment at a ratio of 1:5 and with a pigment/volume concentration of 10% in the test lacquer are a* between 3 and 7 and b* between 38 and 41.

8. Iron oxide yellow pigments according to claim 7, wherein the silking index SI is less than 3.

9. Iron oxide yellow pigments according to claim 7, wherein silking index SI is less than 1.

10. Iron oxide yellow pigments produced by the process of claim 1.

11. Iron oxide yellow pigments produced by the process of claim 2.

12. Iron oxide yellow pigments produced by the process of claim 3.

13. A lacquer, paint or plastic material, colored with the iron oxide yellow pigments of claim 4.

14. A lacquer, paint or plastic material colored with the iron oxide yellow pigments of claim 5.

15. A lacquer, paint or plastic material, colored with the iron oxide pigments of claim 6.

16. A lacquer, paint or plastic material, colored with the iron oxide yellow pigments of claim 7.

17. A lacquer, paint or plastic material, colored with the iron oxide yellow pigments of claim 8.

18. A lacquer, paint or plastic material, colored with the iron oxide yellow pigments of claim 9.

19. A lacquer, paint or plastic material, colored with the iron oxide yellow pigments of claim 10.

20. A lacquer, paint or plastic material colored with the iron oxide yellow pigments of claim 11.

* * * * *